(12) United States Patent
Aoki

(10) Patent No.: US 11,820,428 B2
(45) Date of Patent: *Nov. 21, 2023

(54) CONTROL DEVICE FOR VEHICLE TRAVELING

(71) Applicant: TOYOTA JIDOSHA KABUSHIKI KAISHA, Toyota (JP)

(72) Inventor: Kenichiro Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,926

(22) Filed: Dec. 7, 2022

(65) Prior Publication Data

US 2023/0097498 A1  Mar. 30, 2023

Related U.S. Application Data

(63) Continuation of application No. 16/920,827, filed on Jul. 6, 2020, which is a continuation of application (Continued)

(30) Foreign Application Priority Data

Dec. 7, 2016 (JP) ................................. 2016-237705

(51) Int. Cl.
  *B62D 15/02* (2006.01)
  *G05D 1/00* (2006.01)
  (Continued)

(52) U.S. Cl.
  CPC ........... *B62D 15/0255* (2013.01); *B60Q 9/00* (2013.01); *B60W 50/10* (2013.01); *B60W 50/14* (2013.01);
  (Continued)

(58) Field of Classification Search
  CPC .. B62D 15/0255; B62D 1/286; B62D 15/025; B62D 15/0265; B60Q 9/00; B60W 50/10;
  (Continued)

(56) References Cited

U.S. PATENT DOCUMENTS 9,796,416 B2   10/2017   Fuji et al.
10,222,796 B2   3/2019   Ichikawa et al.
(Continued)

FOREIGN PATENT DOCUMENTS

DE   102013021337 A1   8/2014
JP   2015174494 A   10/2015

OTHER PUBLICATIONS

U.S. Appl. No. 16/920,827, filed Jul. 6, 2020, Kenichiro Aoki.
(Continued)

*Primary Examiner* — James J Lee
*Assistant Examiner* — Andrew Sang Kim
(74) *Attorney, Agent, or Firm* — Dinsmore & Shohl LLP

(57) ABSTRACT

The autonomous LC control is started in response to receiving a start instruction of autonomous lane change. When the driver performs a steering intervention in a same direction as a direction of steering requested by the autonomous LC control, and establishment of a stop condition of lane change is not recognized, during execution of the autonomous LC control, the autonomous driving control is continued. When the steering intervention in the same direction is performed, and establishment of the stop condition is recognized, during execution of the autonomous LC control, termination of the autonomous driving control is announced.

5 Claims, 4 Drawing Sheets

Related U.S. Application Data

No. 15/819,662, filed on Nov. 21, 2017, now Pat. No. 10,737,723.

(51) Int. Cl.

| | | |
|---|---|---|
| *B62D 1/28* | (2006.01) | |
| *B60W 50/14* | (2020.01) | |
| *B60W 50/10* | (2012.01) | |
| *B60W 30/12* | (2020.01) | |
| *G05D 1/02* | (2020.01) | |
| *B60Q 9/00* | (2006.01) | |

(52) U.S. Cl.
CPC .......... *B62D 1/286* (2013.01); *B62D 15/025* (2013.01); *B62D 15/0265* (2013.01); *G05D 1/0022* (2013.01); *G05D 1/0061* (2013.01); *G05D 1/021* (2013.01); *B60W 30/12* (2013.01); *B60W 2540/18* (2013.01)

(58) Field of Classification Search
CPC .. B60W 50/14; B60W 30/12; B60W 2540/18; B60W 30/09; B60W 30/0956; B60W 30/182; B60W 2554/00; B60W 2554/80; B60W 2710/20; G05D 1/0022; G05D 1/0061; G05D 1/021
See application file for complete search history.

(56) References Cited

U.S. PATENT DOCUMENTS

| | | |
|---|---|---|
| 10,308,254 B2 | 6/2019 | Hirano et al. |
| 10,310,508 B2 | 6/2019 | Kunisa et al. |
| 10,579,056 B2 | 3/2020 | Matsumura |
| 10,649,452 B2 | 5/2020 | Ichikawa et al. |
| 10,654,482 B2 | 5/2020 | Urano et al. |
| 10,895,875 B2 | 1/2021 | Hashimoto et al. |
| 11,260,868 B2 | 3/2022 | Urano et al. |
| 11,327,485 B2 | 5/2022 | Sato et al. |
| 2005/0155808 A1 | 7/2005 | Braeuchle et al. |
| 2015/0239500 A1 | 8/2015 | Green et al. |
| 2016/0091896 A1* | 3/2016 | Maruyama ...... B60W 30/18163 701/23 |
| 2016/0334788 A1 | 11/2016 | Park |
| 2017/0183013 A1 | 6/2017 | Matsumoto et al. |
| 2017/0240177 A1 | 8/2017 | Fujii et al. |
| 2017/0371334 A1* | 12/2017 | Nagy ..................... B60K 35/00 |
| 2019/0092346 A1 | 3/2019 | Odate et al. |

OTHER PUBLICATIONS

Espacenet English Translation of DE102013021337A1 (Year: 2014).
Non-Final Office Action dated Jan. 13, 2023 to U.S. Appl. No. 16/920,827, filed Jul. 6, 2020.
Notice of Allowance dated Jun. 27, 2023, issued to related U.S. Appl. No. 16/920,827, filed Jul. 6, 2020.
Non-Final Office Action dated Apr. 3, 2023 in related U.S. Appl. No. 16/920,827.

* cited by examiner

CONTROL DEVICE FOR VEHICLE TRAVELING

CROSS-REFERENCE TO RELATED APPLICATION(S)

This application is a continuation application of co-pending of U.S. application Ser. No. 16/920,827 filed on Jul. 6, 2020, for "Control Device For Vehicle Traveling," which is a continuation application of co-pending U.S. patent application Ser. No. 15/819,662, filed Nov. 21, 2017, which claims priority to Japanese Patent Application No. 2016-237705 filed on Dec. 7, 2016, the entire contents of which are herein incorporated by reference.

BACKGROUND

Field

Embodiments of the present disclosure relates to a control device for vehicle traveling, and particularly relates to a control device for vehicle traveling for achieving autonomous driving including autonomous lane change of a vehicle.

Background Art

Japanese Patent Laid-Open No. 2015-174494 discloses a lane change assisting device for causing a vehicle to perform lane change autonomously. The above described lane change assisting device firstly sets a target acceleration at the time of lane change. Next, the lane change assisting device calculates a desired distance sustainable time based on the target acceleration. The desired distance sustainable time is a time period during which a sufficient relative distance can be sustained between the vehicle and another vehicle. Next, the lane change assisting device sets a target route for completing lane change within a range of the desired distance sustainable time. When the target route can be set, the vehicle is caused to perform lane change autonomously. On the other hand, when it is determined that lance change within the desired distance sustainable time is difficult, the arithmetic operation for lane change is ended.

LIST OF RELATED ART

Following is a list of patent literatures which the applicant has noticed as related arts of the present disclosure.
[Patent Literature 1]
Japanese Patent Laid-Open No. 2015-174494

SUMMARY

While a vehicle is traveling by autonomous driving control, a steering intervention by a driver may occur. In the vehicle equipped with the above described conventional lane change assisting device, it is necessary to assume an intervention by the driver. For example, when a steering intervention that assists lane change is performed by the driver during the lane change is being autonomously performed by the lane change assisting device, it is appropriate to reflect such an assist in a vehicle behavior.

If the intervention by the driver coincides with the determination of the autonomous lane change, it is desirable not to cancel the mode of autonomous driving. Meanwhile, when the driver forces to perform lane change under a situation in which lane change should be waited according to the decision of the autonomous lane change, it is unfavorable that the mode of autonomous driving is continued because the intention of the driver does not coincide with the intention of the autonomous driving.

However, in the above described conventional lane change assisting device, the relationship between how the steering intervention is done by the driver and when the autonomous driving should be maintained is not defined. If it is defied that the mode of autonomous driving should be canceled whenever there is a steering intervention, frequent cancellation of the mode may cause the driver to be annoyed. On the other hand, according to the setting that the mode is never canceled at all times, the driver may tend to feel a sense of discomfort because autonomous driving that is not in line with the intention is continued.

Embodiments of the present disclosure have been made to solve the above described problem, and an object of an embodiment of the present disclosure is to provide a control device for vehicle traveling that can let a driver know, when the driver forces to perform lane change under a situation in which lane change should not be performed, that the lane change forcibly done by the driver does not coincide with an intention of the decision of the autonomous driving, without giving much annoyance to the driver.

To achieve the above mentioned purpose, a first aspect of an embodiment of the present disclosure is a control device for vehicle traveling that executes autonomous driving control that causes a vehicle to travel autonomously,
  the autonomous driving control including autonomous lane change control that achieves autonomous lane change of a vehicle, and
  the control device for vehicle traveling executing:
  a process of starting the autonomous lane change control in response to receiving an instruction to start the autonomous lane change;
  a process of determining whether or not a stop condition of the autonomous lane change is established;
  a process of giving priority to steering of a driver over steering that is caused by the autonomous lane change control when there is a steering intervention by the driver during execution of the autonomous lane change control;
  a process of continuing the autonomous driving control when a driver performs a steering intervention in a same direction as a direction of steering that is requested by the autonomous lane change control, and establishment of the stop condition is not recognized, during execution of the autonomous lane change control; and
  a termination announcement process of announcing termination of the autonomous driving control when the steering intervention in said same direction is performed, and establishment of the stop condition is recognized, during execution of the autonomous lane change control.

A second aspect of an embodiment of the present disclosure is the control device for vehicle traveling according to the first aspect discussed above, further executing a process for determining whether there arises an excessive approach to an obstacle that is present on a lane to which the vehicle intends to move based on a relative distance from the obstacle, during execution of the autonomous lane change control, and
  recognizing that said stop condition is established when the presence of the excessive approach is affirmed.

A third aspect of an embodiment of the present disclosure is the control device for vehicle traveling according to the first aspect discussed above, further executing a process for acquiring prohibition information on lane change based on information that is read from an on-vehicle storage device or information that is provided from outside of the vehicle, and recognizing that stop condition is established when the vehicle is recognized as located in a lane change prohibited area, based on the prohibition information.

A fourth aspect of an embodiment of the present disclosure is the control device for vehicle traveling according to the first aspect discussed above wherein the autonomous lane change control is continued until completion of lane change is determined, and the termination announcement process is executed when establishment of the stop condition is recognized before end of the autonomous lane change control, after occurrence of the steering intervention in the same direction.

A fifth aspect of an embodiment of the present disclosure is the control device for vehicle traveling according to the first aspect discussed above, further executing returning-to-original-lane control that terminates the autonomous lane change control and causes the vehicle to return to an original lane autonomously, when establishment of the stop condition is recognized before a steering intervention by the driver occurs, after start of the autonomous lane change control, and executing said termination announcement process when the steering intervention in said same direction is performed by the driver during execution of the returning-to-original-lane control.

A sixth aspect of an embodiment of the present disclosure is the control device for vehicle traveling according to the fifth aspect discussed above, further executing returning-to-original-lane control that terminates the autonomous lane change control and causes the vehicle to return to an original lane autonomously, when the driver performs a steering intervention in a counter direction to a direction of steering that is requested by the autonomous lane change control before establishment of the stop condition is recognized, after start of the autonomous lane change control, and executing a process of continuing the autonomous driving control when the driver does not perform the steering intervention in said same direction, during execution of the returning-to-original-lane control.

A seventh aspect of an embodiment of the present disclosure is the control device for vehicle traveling according to the first aspect discussed above, further executing returning-to-original-lane control that terminates the autonomous lane change control and causes the vehicle to return to an original lane autonomously, when the driver performs a steering intervention in a counter direction to a direction of steering that is requested by the autonomous lane change control before establishment of the stop condition is recognized, after start of the autonomous lane change control, and executing the termination announcement process when the driver performs the steering intervention in said same direction, during execution of the returning-to-original-lane control.

An eighth aspect of an embodiment of the present disclosure is the control device for vehicle traveling according to the first aspect discussed above, further executing a process of terminating the autonomous driving control, simultaneously with the termination announcement process, or subsequently to the termination announcement process.

ADVANTAGES OF EMBODIMENTS OF THE PRESENT DISCLOSURE

According to the first aspect of the embodiment, when steering is performed by the driver after autonomous lane change control is started in response to receiving the instruction to start autonomous lane change, the steering is given priority over autonomous lane change control. Consequently, even after start of the autonomous lane change, the driver can take back vehicle control authority immediately. According to this rule, even under a situation in which the stop condition of autonomous lane change is established, lane change is forced to be performed by the steering intervention in the same direction as the autonomous lane change. According to the present aspect of the embodiment, in such a case, termination of the autonomous driving control is announced, whereby it can be made obvious that the intention of the driver is different from the intention of the autonomous driving control. On the other hand, under a situation in which the stop condition of autonomous lane change is not established, the steering intervention in the same direction does not mean forceful lane change. If the driver were announced of termination of the autonomous driving in this case, the driver might feel it troublesome. According to the present aspect of the embodiment, autonomous driving control is continued in such a case, so that the driver is never caused to be annoyed of this kind.

According to the second aspect of the embodiment, it can be determined that the stop condition of autonomous lane change is established, when the vehicle excessively approaches an obstacle on the lane to which the vehicle intends to move during execution of the autonomous lane change control. Consequently, according to the present aspect of the embodiment, when the driver forces lane change under the situation in which such an excessive approach occurs, termination of the autonomous driving control can be announced appropriately.

According to the third aspect of the embodiment, when the driver forces lane change in the lane change prohibited area, termination of the autonomous driving control can be announced appropriately.

According to the fourth aspect of the embodiment, when the stop condition is established by a steering intervention by the driver after start of the autonomous lane change control, termination of the autonomous driving control can be appropriately announced.

According to the fifth aspect of the embodiment, when establishment of the stop condition is recognized under the situation in which the driver does not perform a steering intervention after the start of autonomous lane change control, the autonomous lane change control is terminated at that point of time, and returning-to-original-lane control is started. When the driver wants to perform lane change, a steering intervention to a side to change the lane occurs at a stage when the vehicle shows a behavior of returning to the original lane. According to the present aspect of the embodiment, when such steering intervention is performed, termination of the autonomous driving control can be announced appropriately.

According to the sixth aspect of the embodiment, when steering intervention in the direction to return the vehicle to the original lane is performed after the start of autonomous lane change control, returning-to-original-lane control is started, assuming that the driver requests to stop lane change. When return to the original lane is completed without the driver changing his or her mind, it can be determined that the driver does not intend to force lane change. According to the present aspect of the embodiment, in such a case, autonomous driving can be continued as it is, and the driver can be prevented from being annoyed.

According to the seventh aspect of the embodiment, when a steering intervention in the direction to return the vehicle to the original lane is performed after the start of autonomous lane change control, returning-to-original-lane control is started, assuming that the driver requests to stop lane change. When a steering intervention in the direction of lane change is performed again, during execution of the returning-to-original-lane control, it is determined that the intention of the driver and the intention of the autonomous driving do not coincide with each other, and termination of the autonomous driving can be announced.

According to the eighth aspect of the embodiment, autonomous driving control can be terminated under the situation in which it is determined that the intention of the driver deviates from the intention of the autonomous driving control.

DETAILED DESCRIPTION

First Embodiment

[Hardware Configuration of First Embodiment]

Figure 1:
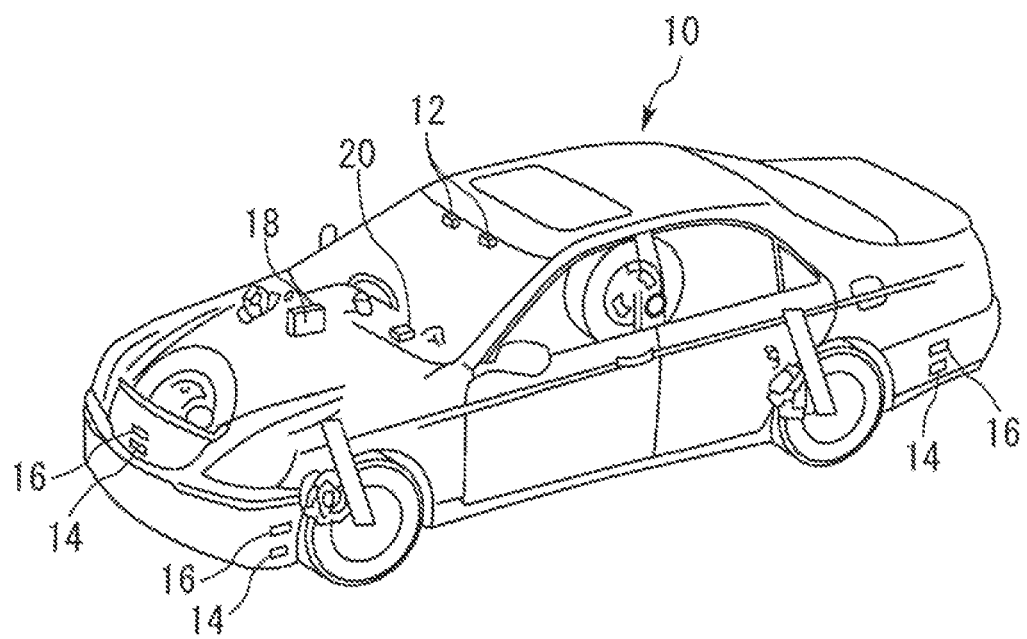
FIG. 1 is a diagram for explaining the configuration of a first embodiment of the present disclosure.

FIG. 1 illustrates a hardware configuration of an autonomous driving vehicle 10 equipped with a control device for vehicle traveling according to a first embodiment of the present disclosure. As illustrated in FIG. 1, the vehicle 10 is equipped with a stereo camera 12. The stereo camera 12 can pick up a stereoscopic image of a front of the vehicle 10 at a predetermined viewing angle. It is also possible to replace the stereo camera 12 with a monocular camera.

Further, a plurality of LIDAR (Laser Imaging Detection and Ranging) units 14 are mounted on the vehicle 10 in such a manner as to surround the vehicle. More specifically, six of the LIDAR units 14 in total are mounted so that a region in front of the vehicle, left and right regions in front of the vehicle, a region behind the vehicle, left and right regions behind the vehicle are detection regions. According to the LIDAR units 14, outlines of objects present in the respective detection regions and distances to the objects can be detected.

Furthermore, a plurality of millimeter wave radar units 16 are mounted on the vehicle 10 so as to surround the vehicle. Five of the millimeter wave radar units 16 in total are mounted so that the region in front of the vehicle, the left and right regions in front of the vehicle, and the left and right regions behind the vehicle are detection ranges. According to the millimeter wave radar units 16, distances to objects present in the respective detection regions, and relative speeds of the objects and the vehicle 10 can be detected.

Hereunder, the stereo camera 12, the LIDAR units 14 and the millimeter wave radar units 16 described above are collectively referred to as "object recognition sensors".

The vehicle 10 is equipped with an ECU (Electronic Control Unit) 18. Detection signals of the aforementioned "object recognition sensors" are supplied to the ECU 18. Based on the detection signals, the ECU 18 can detect nearby other vehicles, pot holes on road, pylons placed in a construction site and the like, a fallen object left on a road, a tail end of congestion and the like. Hereunder, these matters will be collectively referred to an "obstacle".

The vehicle 10 is also equipped with a GPS (Global Positioning System) unit 20. According to the GPS unit 20, a present location of the vehicle 10 can be detected by using a GPS. An output signal of the GPS unit 20 is supplied to the ECU 18. Map data is stored in the ECU 18. The ECU 18 can determine a present location of the vehicle 10 on a map, and further can determine whether or not the present location of the vehicle 10 belongs to a lane change prohibited area, based on the map data and the signals sent from the GPS unit 20.

In the present embodiment, the ECU 18 can execute autonomous operation control for causing the vehicle 10 to travel autonomously. The autonomous driving control includes autonomous lane change control (hereunder, referred to as "autonomous LC control") for causing the vehicle 10 to perform lane change autonomously.

Autonomous LC control is started by any one of the following three cases.

(1) In a case where the ECU 18 determines start of lane change
(2) In a case where the driver instructs start of autonomous LC control
(3) In a case where the ECU 18 proposes implementation of lane change to the driver, and the driver approves implementation of lane change In the present embodiment, in an interior of the vehicle 10, an interface (a switch or the like) for the driver to input an instruction or approval concerning autonomous driving, and an interface (a lamp, a speaker or the like) for the ECU 18 to propose implementation of lane change to the driver are disposed (none of them is illustrated). In any case, when autonomous LC control is started, flashing of a direction indicator is started, and notification of start of the autonomous lane change is issued. The start of flashing and issuing of notification may be simultaneously performed, or either one of them may be performed first.

Hereunder, in the case of (1) described above, determination of start of lane change by the ECU 18 corresponds a "start instruction" of autonomous lane change. Further, in the case of (2) or (3) described above, the instruction or the approval by the driver corresponds the start instruction of autonomous lane change. Further, in any case, a time point at which flashing of the direction indicator or notification of autonomous driving is started subsequently to the start instruction thereof can be regarded as the same as a time point of the "start of autonomous LC control".

[Feature of First Embodiment]

FIGS. 2A to 2F are views for explaining behaviors that can occur in the vehicle 10 after the start of autonomous LC control. In a road in each of the drawings, a left side of a broken line 22 is set as a travel lane, and a right side of the broken line 22 is set as a passing lane. During execution of autonomous driving control, the ECU 18 may determine whether or not to try to pass, based on a relative distance to a preceding vehicle 24 based on a relative speed and the relative distance. When determining to do passing, the ECU 18 issues an instruction to start autonomous lane change (hereunder, referred to as an "LC start instruction") at a time point of the decision making.

Figure 2A:
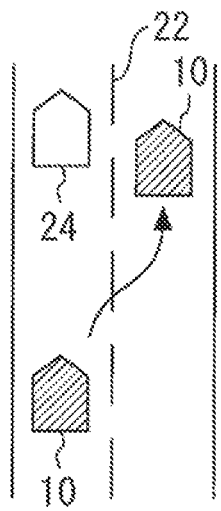
FIG. 2A illustrates a vehicle behavior in a case where the LC start instruction is issued under a situation in which no obstacle such as a nearby other vehicle is present.

FIG. 2A illustrates a behavior in a case where the LC start instruction is issued under a situation in which no obstacle such as a nearby other vehicle is present. In this case, the vehicle 10 can quickly start lane change after startup of the autonomous LC control, and will be able to smoothly complete lane change.

Figure 2B:
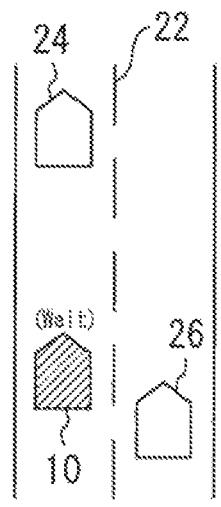
FIG. 2B illustrates a vehicle behavior in a case where at the time point of start of the autonomous LC control, a nearby other vehicle that travels side by side with the vehicle is present on the passing lane.

FIG. 2B illustrates an example of a behavior in a case in which at the time point of start of the autonomous LC control, the nearby other vehicle 26 that travels side by side with the vehicle 10 is present on the passing lane. According to the autonomous LC control, in such a case, an instruction to wait for a chance of lane change until the nearby other vehicle 26 overtakes the vehicle 10 and runs ahead is issued. Subsequently, lane change is performed after the nearby other vehicle 26 runs ahead.

Figure 2C:
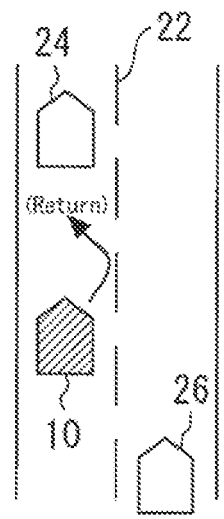
FIG. 2C illustrates a vehicle behavior in a case where at the time point of start of the autonomous LC control, a nearby other vehicle approaching at a high speed is present behind the vehicle on the passing lane.

FIG. 2C illustrates an example of a behavior in a case in which at the time point of start of the autonomous LC control, the nearby other vehicle 26 approaching at a high speed is present behind the vehicle 10, on the passing lane. Under such a situation, after lane change is started by the autonomous LC control, presence of the nearby other vehicle 26 may be detected in the vehicle 10 during the lane change. In this case, the autonomous driving control of the present embodiment stops the autonomous LC control, and executes "returning-to-original-lane control". The returning-to-original-lane control is designed so as to return the vehicle 10 which is in the course of lane change to the original travel lane. As a result, in the vehicle 10, a returning behavior as illustrated in FIG. 2C appears.

In the present embodiment, when there arises an intervention of a driving operation by the driver during execution of autonomous driving control, the ECU 18 gives priority to the operation by the driver over the operation requested by the autonomous driving control. For example, when the driver starts a steering operation, after flush of the direction indicator is started or announcement of the autonomous lane change start is provided following the start of the autonomous LC control and before vehicle behavior due to the autonomous LC control appears, the ECU 18 gives a steering angle corresponding to the steering operation to the wheels to be steered.

Figure 2D:
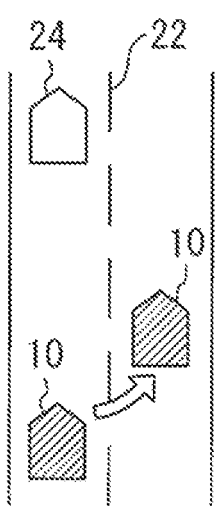
FIG. 2D illustrates a vehicle behavior in a case where a steering intervention by the driver occurs under the situation illustrated in FIG. 2A.

FIG. 2D illustrates a behavior in a case in which a steering intervention by the driver occurs under the situation illustrated in FIG. 2A. In FIG. 2D, as a result of the steering intervention, lane change is completed earlier as compared with the case of FIG. 2A. When there is an intervention by the driver during execution of autonomous driving, it is conceivable to cancel the autonomous driving immediately, and return the driving authority to the driver. However, under the situation in which no other vehicle exists around the vehicle 10, there arises no practical inconvenience by the assist in lane change by the driver. Further, in this case, the intention of the driver and the intention of the autonomous LC control coincide with each other in the point of carrying out lane change. When autonomous driving is canceled under such a situation, the driver has to set the autonomous driving again, and being apt to feel annoyance. Consequently, the present embodiment does not cancel the autonomous driving by the steering intervention by the driver, and continuously executes the autonomous driving control also after disappearance of the intervention in such a case.

Figure 2E:
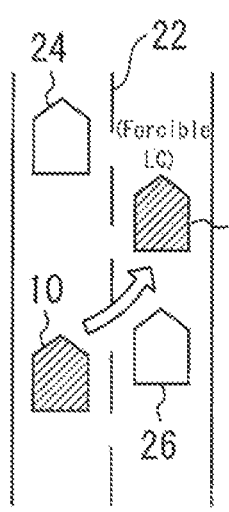
FIG. 2E illustrates a state where lane change is forcibly done by the driver under the situation illustrated in FIG. 2B.
Figure 2F:
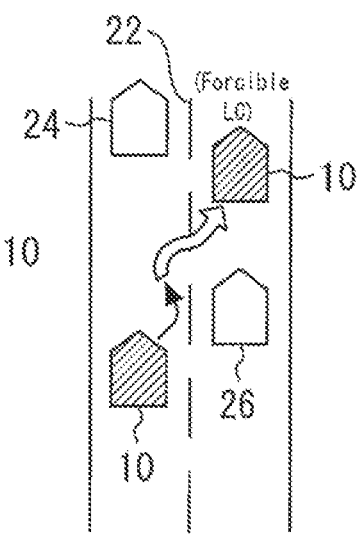
FIG. 2F illustrates a state where lane change is forcibly done by the driver after returning-to-original-lane control is started under the situation illustrated in FIG. 2C.

FIG. 2E illustrates a state in which the driver forces to lane change under the situation illustrated in FIG. 2B. FIG. 2F illustrates a state in which the driver forces lane change after the returning-to-original-lane control is started under the situation illustrated in FIG. 2C. That is, FIG. 2D and FIG. 2F both illustrate the states in each of which the driver forces lane change in such a manner as to cut in before the nearby other vehicle 26 under the situation in which a stop condition of autonomous lane change (hereunder, referred to as "an LC stop condition") is established. Such forceful lane change could force the nearby other vehicle 26 to take sudden braking. Moreover, in regard with implementation of lane change, the intention of the driver is totally different from the intention of autonomous LC control. Such a situation tends to occur when the driver is in a more urgent state with respect to a move plan on which autonomous driving is based. If the autonomous driving is continued under such a situation, the driver is apt to feel a sense of discomfort. Thus, in the case in which lane change is forced by the driver under the situation in which the LC stop condition is established, the present embodiment cancels the autonomous driving quickly after providing an announcement for noticing it.

[Operation of First Embodiment]

Figure 3:
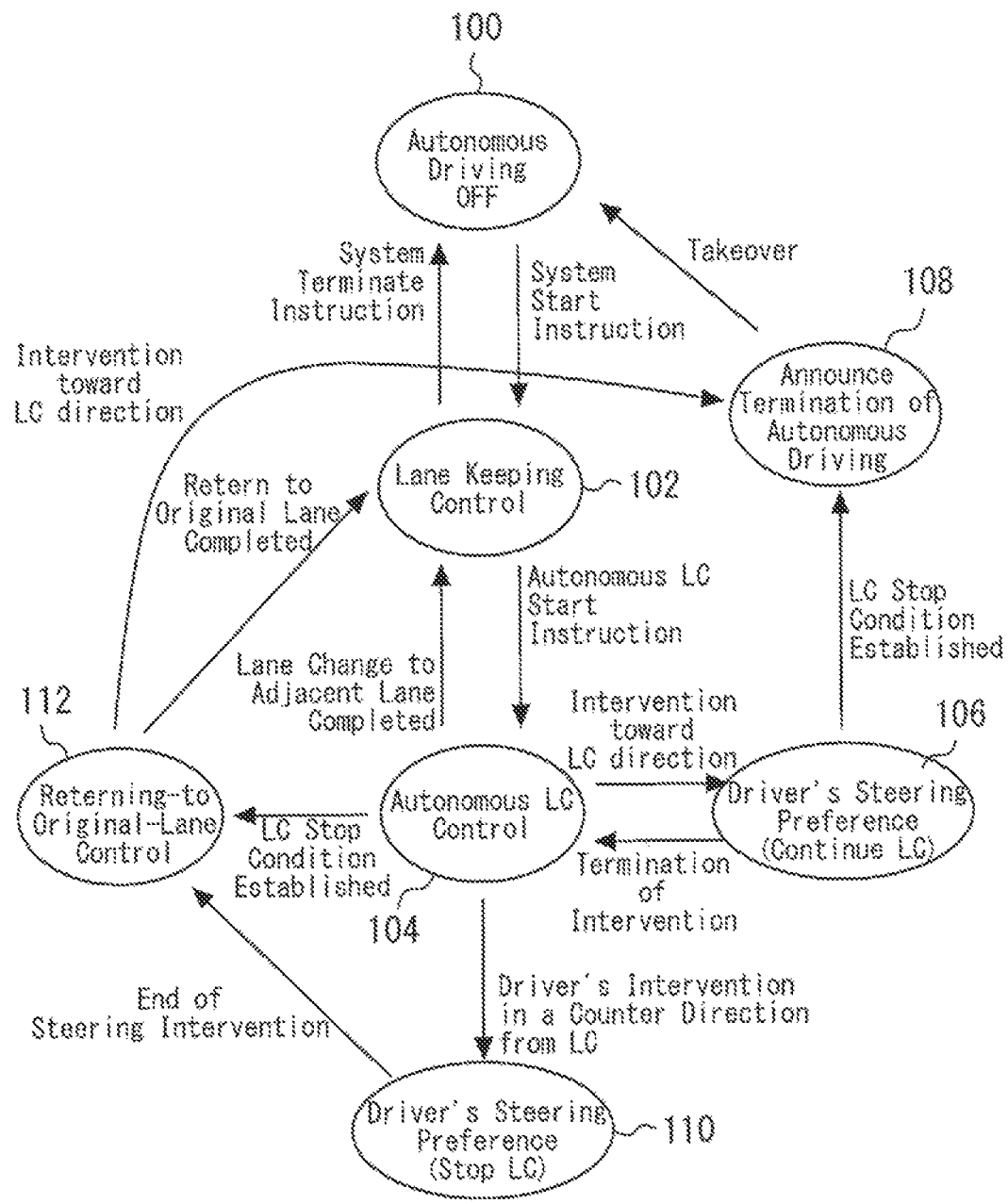
FIG. 3 illustrates a state transition diagram concerning the vehicle the present embodiment.

FIG. 3 is a state transition diagram concerning the vehicle 10 of the present embodiment. Hereunder, with a state 100 of "autonomous driving OFF" as a starting point, various states and state transitions occurring in the vehicle 10 will be described.

When the driver inputs a system start instruction in the state 100 of autonomous driving OFF, the vehicle 10 transitions to a state 102 of lane keeping control. On the other hand, when in the state 102 of lane keeping control, a system end instruction is inputted, the state 102 transitions to the state 100 of autonomous driving OFF.

In the state 102 of lane keeping control, processing is performed, which is for causing the vehicle 10 to travel along the same lane with a guardrail and a white line on the lane as marks. For example, when the travel speed is specified, lane keeping control in which the vehicle speed is kept to the specified one is performed. Further, when a following distance from a preceding vehicle is specified, lane keeping control in which the distance is kept to the specified one is performed.

When the LC start instruction occurs in the state 102 of lane keeping control, the vehicle 10 transitions to a state 104 of autonomous LC control. The transition occurs specifically when the ECU 18 itself determines start of lane change, when the driver instructs start of autonomous lane change, or when the driver approves autonomous lane change that is proposed by the ECU 18.

In the state 104 of autonomous LC control, processing for moving the vehicle 10 to a target lane is performed. In the state 104, it is firstly determined whether the lane to which the vehicle intends to move is located on either a left of the vehicle 10, or a right of the vehicle 10. Next, flashing of the direction indicator is started. Subsequently, start of the autonomous lane change is announced to the driver. Thereafter, whether or not lane change is possible is determined in accordance with the situation of the nearby other vehicles and the like. That is, it is determined whether a condition under which the lane change should be stopped has been established.

In this stage, following determinations are performed specifically.

(1) Whether an obstacle that hinders travel of the vehicle 10 is present on the lane to which the vehicle intends to move?

(2) Whether the present location of the vehicle 10 belongs to a lane change prohibited area?

It will be determined that an obstacle is present, when a nearby other vehicle that is predicted to approach the vehicle 10 excessively is present in the lane to which the vehicle intends to move based on a relative distance, or based on a relative speed and the relative distance, for example. Further, when a pot hole on road, pylons in a construction site and the like are present in positions that hinder travel of the vehicle 10, presence of obstacles is also determined.

When it is determined that the LC stop condition is established as a result of the above described processing, lane change is not started until the condition is canceled. When it is determined that lane change is possible, processing of acceleration or deceleration and steering for moving the vehicle 10 to the target lane is started. The processing for determining the LC stop condition, and the processing of acceleration or deceleration and steering are repeatedly carried out until lane change is completed. When completion of move to the adjacent lane is determined, the autonomous LC control is terminated, and transition to the state 102 of lane keeping control occurs.

In the present embodiment, the ECU 18 determines that a steering intervention by the driver occurs, when detecting a steering amount (or a steering force) exceeding a threshold value. When a steering intervention in the same direction as autonomous lane change occurs during execution of autonomous LC control, the state of the vehicle 10 transitions to a state 106 of driver's steering preference. In the state 106, an arithmetic operation concerning the autonomous LC control is continued, but a steering amount by the driver has priority over a steering amount by the arithmetic operation.

As described above, after start of the autonomous LC control, it is repeatedly determined whether or not the LC stop condition is established, until lane change is completed. In the state 106 of driver's steering preference, steering of the driver has priority irrespective of whether or not the LC stop condition is established.

The driver may perform steering operation for the purpose of promoting change in behavior by autonomous LC control after confirming that there is no matter that hinders lane change. In such a case, the LC stop condition is not established during the steering intervention by the driver. In other words, if the LC stop condition is not established during the steering intervention, it can be determined that the driver does not intend to force lane change against the determination of the autonomous LC control. In this case, the ECU 18 transfers the state 106 of driver's steering preference to the state 104 of autonomous LC control after termination of the steering intervention by the driver.

When establishment of the LC stop condition is recognized in the state 106 of driver's steering preference, it can be determined that the driver intends to force lane change against the determination of the autonomous LC control. In this case, the ECU 18 transfers the state 106 of driver's steering preference to a state 108 of announcement of termination of autonomous driving, after the steering intervention is terminated. The transition may be caused at a time point at which establishment of the LC stop condition is determined, or at a time point at which completion of lane change is determined.

In the state 108 of announcement of termination of autonomous driving, the driver is notified of stop of the autonomous driving. Thereafter, the autonomous driving is canceled when a predetermined time period elapses. As a result, the state of the vehicle 10 transfers to the state 100 of autonomous driving OFF, and the driving operation authority is taken over by the driver (i.e., takeover of the authority by the driver occurs). When the driver desires restart of autonomous driving, the driver needs to input the system start instruction again. It should be noted that transition may be made to the state 102 of lane keeping control from the state 108 without canceling the autonomous driving when the driver issues a continuation instruction quickly after the termination of the autonomous driving is announced.

In some cases, the autonomous LC control may be started under a situation in which the driver does not desire lane change. In that case, the driver may perform steering operation in a counter direction from the lane change (hereunder, this operation is referred to as "counter direction steering") at a stage at which a behavior of autonomous lane change appears in the vehicle 10. Such steering intervention may also occur when the driver recognizes presence of an obstacle before the ECU 18.

When an intervention of the counter direction steering occurs in the state 104 of autonomous LC control, the ECU 18 transfers the state 104 to a state 110 of driver's steering preference. In the state 110, all of the processing of the autonomous LC control are stopped, and thereafter, steering by the driver is reflected in the behavior of the vehicle 10.

When the intervention of the counter direction steering is terminated in the state 110 of driver's steering preference, the ECU 18 transfers the state 110 to a state 112 of returning-to-original-lane control. In the returning-to-original-lane control, processing of acceleration or deceleration and steering for returning the vehicle 10 to the original lane is executed. When completion of return to the original lane is determined, the state of the vehicle 10 is transferred to the state 102 of lane keeping control.

In the state 104 of autonomous LC control, establishment of the LC stop condition may be determined after autonomous steering is started. In this case, the ECU 18 stops the autonomous LC control to transfer the state of the vehicle 10 to the state 112 of returning-to-original-lane control. As a result, the returning-to-original-lane control is started, and the vehicle 10 that had once started to move to the adjacent lane starts to return to the original lane. Thereafter, when completion of return to the original lane is determined, the state of the vehicle 10 is transferred to the state 102 of lane keeping control.

A steering intervention of the driver may occur in the state 112 of returning-to-original-lane control. Specifically, (1) after the autonomous LC control recognizes establishment of the LC stop condition and the state of the vehicle 10 is transferred to the state 112 of returning-to-original-lane control, the driver may perform steering operation to force lane change. In that case, it can be determined that the intention of the driver does not coincide with the determination of the autonomous driving.

A similar steering intervention also occurs (2) when the driver who has steered in the counter direction to stop lane change temporarily after start of the autonomous LC control turns the steering direction toward the lane change side while changing his or her mind. In that case, it can be read that the driver does not accept the determination of the autonomous driving. That is, in each of the cases of (1) and (2) described above, it can be determined that the intention of the driver does not coincide with the determination of autonomous driving concerning whether or not to perform lane change. Consequently, when a steering intervention to the direction of lane change occurs in the state 112 of returning-to-original-lane control, the ECU 18 gives priority to the steering intervention, and thereafter transfers the state of the vehicle 10 to the state 108 of announcement of the termination of the autonomous driving. After the transition occurs, the driver is notified of the termination of the autonomous driving, and thereafter, the autonomous driving is canceled (similar to the case of the transition from the state 106 to the state 108).

In the state 112 of returning-to-original-lane control, a steering intervention to a direction to assist return to the original lane may occur. In that case, since the intention of the driver concerning lane change coincides with the determination of autonomous driving, the steering of the driver is given priority while an arithmetic operation concerning the returning-to-original-lane control is continued. Subsequently, at a time point at which the steering intervention ends, the returning-to-original-lane control is restarted.

[Process Flow in First Embodiment]

Figure 4:
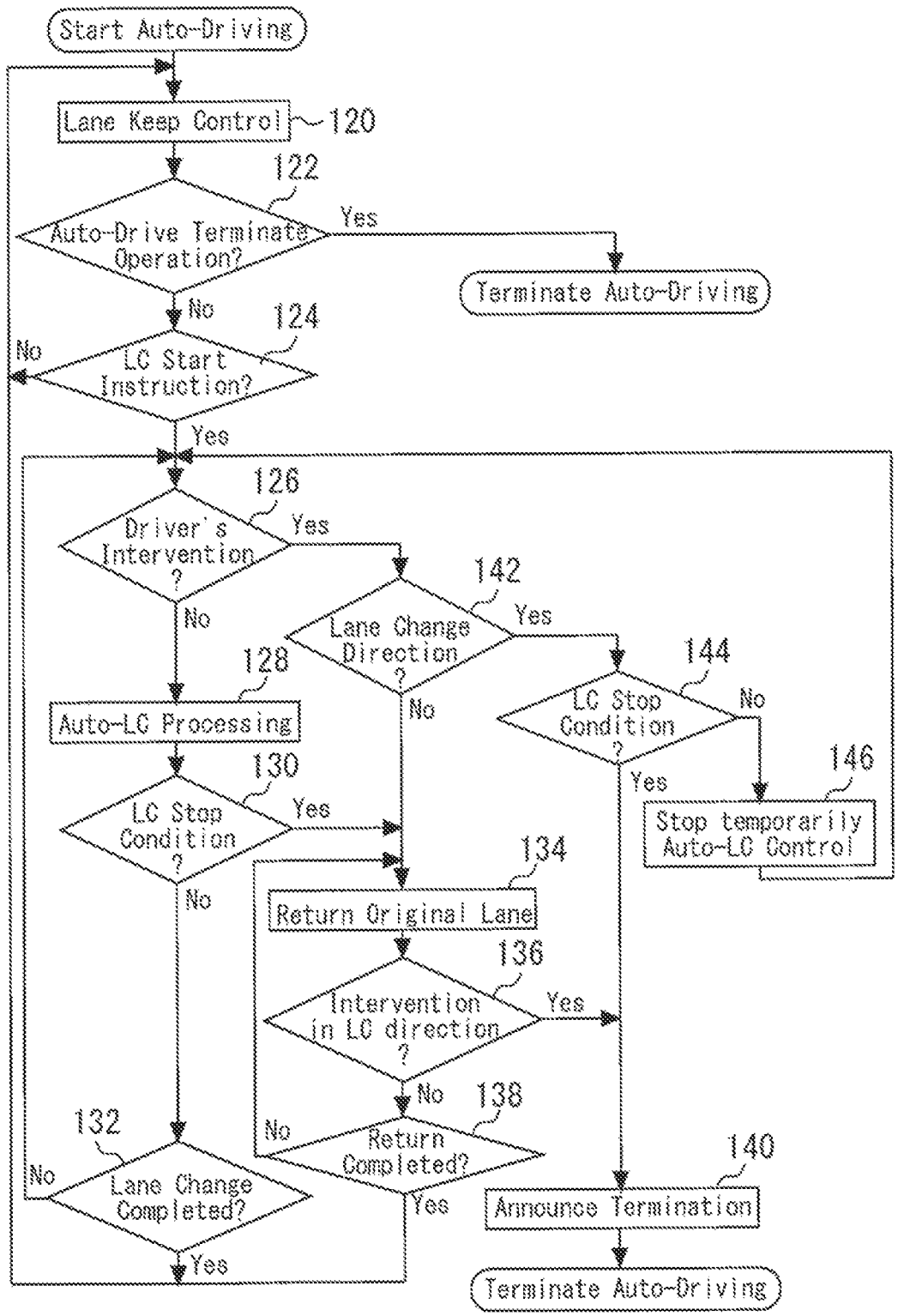
FIG. 4 is a flowchart of a routine executed by the ECU in the present embodiment.

FIG. 4 is a flowchart of a routine executed by the ECU 18 in the present embodiment. The routine illustrated in FIG. 4 is started up by the driver inputting a start instruction of autonomous driving control, that is, a system start instruction. When the routine is started up, lane keeping control is firstly executed (step 120). The lane keeping control is achieved by a plurality of processes being sequentially executed. In the present step, one step of these processes is executed in order in every one cycle.

When the above described processing is completed, it is determined whether or not an operation for terminating the autonomous driving control is performed (step 122). That is, it is determined whether or not a system termination instruction is inputted by the driver.

When it is determined that the above operation is performed, the autonomous driving control is terminated. When the above operation is not detected, it is determined whether or not an LC start instruction is generated (step 124).

When generation of an LC start instruction is not recognized, the processing in step 120 described above is executed again. Thereby, the processing of lane keeping control proceeds by one step. Hereafter, the above described processes are repeated until an operation for termination of the autonomous driving control or an LC start instruction is generated.

When generation of an LC start instruction is recognized in step 124, it is subsequently determined whether or not a steering intervention by the driver occurs (step 126). Specifically, it is determined whether or not a steering amount or a steering force that exceeds a threshold value is inputted by the driver.

When it is determined that a steering intervention does not occur, autonomous LC control is executed (step 128). The autonomous LC control is achieved by a plurality of processes being sequentially executed. In the present step, one step of the processes is executed in every one cycle.

When the above described processing is completed, it is subsequently determined whether or not the LC stop condition is established (step 130). That is, it is determined whether an obstacle that hinders lane change of the vehicle 10 is present, and whether a present location of the vehicle 10 is within a lane change prohibited area.

When establishment of the LC stop condition is not recognized, it is determined whether or not lane change is completed (step 132). Here, completion of lane change is determined when a center position of the vehicle 10 reaches a center of the lane to which the vehicle intends to move, for example.

When it is determined that lane change is not completed yet, the processing in step 126 described above is executed again. If a steering intervention by the drive does not occur, processes of lane keeping control proceed by one step in step 128. Thereafter, processes in steps 126 to 132 are repeated until occurrence of a steering intervention or establishment of the LC stop condition is recognized. When completion of the lane change is recognized in step 132, the processes in step 120 described and the following steps are started again.

When the LC stop condition in step 130 is established in the course of the above described processes being repeated, returning-to-original-lane control is executed to stop lane change and return the vehicle 10 to the original lane (step 134). The returning-to-original-lane control is achieved by a plurality of processes being sequentially executed. In the present step, one step of the processes is executed in every cycle.

When the processing described above is completed, it is determined whether or not a steering intervention to the direction of lane change occurs (step 136). That is, it is determined whether or not steering in the direction to force lane change is performed by the driver.

When such steering intervention is not recognized, it is determined whether or not return to the original lane is completed (step 138). The completion can be determined at a time point at which the center position of the vehicle 10 reaches a center of the original lane, for example.

When completion of return to the original lane is not recognized, the processing in step 134 described above is executed again. This causes the processes of returning-to-original-lane control to proceed by one step. Thereafter, if a steering intervention to force lane change does not occur, the processes in steps 134 to 138 are repeated. When completion of return to the original lane is recognized in step 138, the processes of step 120 described above and the following steps are started again.

When the driver provide a steering intervention in the direction to force lane change in the course of the processes in steps 134 to 138 being repeated, that is, in the course of the returning-to-original-lane control being repeatedly executed, establishment of the condition is determined in step 136. In this case, termination of the autonomous driving control is announced first (step 140), and subsequently, the autonomous driving control is terminated.

When a steering intervention by the driver occurs in the course of the processes in step 120 and the following steps being repeated, the condition in step 126 is established. In this case, it is subsequently determined whether or not the direction of the intervention coincides with the direction of lane change (step 142).

When the direction of the steering intervention differs from the direction of lane change, it can be determined that the driver intends to stop lane change and return the vehicle 10 to the original lane. In that case, the processes in step 134 and the following steps are executed thereafter.

When the direction of the steering intervention coincides with the direction of lane change, it is determined whether or not the LC stop condition is established, subsequently from step 142 (step 144).

If the LC stop condition is not established at this time point, it can be determined that the steering intervention of the driver does not intend to force lane change, but intends to promote lane change. In this case, steering control by autonomous LC control is temporarily stopped while the arithmetic operation concerning the autonomous LC control is continued (step 146). Thereafter, the processes in steps 126 to 142 to 144 to 146 are repeatedly executed. As a result, the state of driver's steering preference is implemented while the arithmetic operation of autonomous LC control is continued. When the steering intervention by the driver disappears, the determination in step 126 becomes not being established, and autonomous LC control is restarted.

On the other hand, when the LC stop condition in step 144 is established in the course of the processes in step 126 to 142 to 144 to 146 being repeated, it can be understood that the driver forces lane change against the determination of the autonomous driving control. In this case, thereafter, the autonomous driving control will be terminated after the processing of step 140.

In the above described explanation, the autonomous driving control is inevitably terminated after the announcement of the termination of the autonomous driving control in step 140. However, the flow of the process is not limited to this. That is, a step of confirming the intention of the driver may be interposed after step 140, and when the intention of continuation of autonomous driving is detected, the processes in step 120 and the following steps may be executed after completion of lane change.

As described above, according to the routine illustrated in FIG. 4, the state transition described with reference to FIG. 3 can be achieved in the vehicle 10. According to the state transition illustrated in FIG. 3, if the driver provide a steering intervention during execution of autonomous LC control, the steering authority can be given to the driver. And, the driver is not caused to be annoyed, because the autonomous driving control is not canceled when the steering is to promote lane change. Further, when the steering is to force lane change, termination of the autonomous driving control is announced, and further, the autonomous driving control is terminated, whereby the driver can avoid feeling a sense of discomfort to autonomous driving.

What is claimed is:

1. A control method for vehicle traveling that executes autonomous driving control that causes a vehicle to travel autonomously,
    the autonomous driving control including autonomous lane change control that achieves autonomous lane change of a vehicle, said control method including:
    starting the autonomous lane change control in response to receiving an instruction to start the autonomous lane change;
    determining whether or not a stop condition of the autonomous lane change is established;
    giving priority to steering of a driver over steering that is caused by the autonomous lane change control when there is a steering intervention by the driver during execution of the autonomous lane change control;
    continuing the autonomous driving control while the driver has priority of steering when a driver performs a steering intervention in a same direction as a direction of steering that is requested by the autonomous lane change control, and establishment of the stop condition is not recognized, during execution of the autonomous lane change control;
    announcing termination of the autonomous driving control when the steering intervention in said same direction is performed, and establishment of the stop condition is recognized, during execution of the autonomous lane change control;
    determining whether there arises an approach to an obstacle that is present on a lane to which the vehicle intends to move based on a relative distance from the obstacle, during execution of the autonomous lane change control; and
    recognizing that said stop condition is established when the presence of the approach is affirmed.

2. The control method for vehicle traveling according to claim 1, further including:
    acquiring information that is read from an on-vehicle storage device or information that is provided from outside of the vehicle; and
    recognizing that the stop condition is established when the vehicle is recognized as located in a lane change prohibited area, based on the information that is read from the on-vehicle storage device or the information that is provided from outside of the vehicle.

3. The control method for vehicle traveling according to claim 1,
    wherein the autonomous lane change control is continued until completion of lane change is determined, and
    the termination of the autonomous driving control is announced when establishment of the stop condition is recognized before end of the autonomous lane change control, after occurrence of the steering intervention in the same direction.

4. A control method for vehicle traveling that executes autonomous driving control that causes a vehicle to travel autonomously,
    the autonomous driving control including autonomous lane change control that achieves autonomous lane change of a vehicle, said control method including:
    starting the autonomous lane change control in response to receiving an instruction to start the autonomous lane change;
    determining whether or not a stop condition of the autonomous lane change is established;
    giving priority to steering of a driver over steering that is caused by the autonomous lane change control when there is a steering intervention by the driver during execution of the autonomous lane change control;
    continuing the autonomous driving control while the driver has priority of steering when a driver performs a steering intervention in a same direction as a direction of steering that is requested by the autonomous lane change control, and establishment of the stop condition is not recognized, during execution of the autonomous lane change control;
    announcing termination of the autonomous driving control when the steering intervention in said same direction is performed, and establishment of the stop condition is recognized, during execution of the autonomous lane change control;
    acquiring information that is read from an on-vehicle storage device or information that is provided from outside of the vehicle; and
    recognizing that the stop condition is established when the vehicle is recognized as located in a lane change prohibited area, based on the information that is read from the on-vehicle storage device or the information that is provided from outside of the vehicle.

5. The control method for vehicle traveling according to claim 4,
    wherein the autonomous lane change control is continued until completion of lane change is determined, and the termination of the autonomous driving control is announced when establishment of the stop condition is recognized before end of the autonomous lane change control, after occurrence of the steering intervention in the same direction.

* * * * *